(No Model.)
G. W. M. SIMMS.
CAR MOVER.
No. 435,326. Patented Aug. 26, 1890.
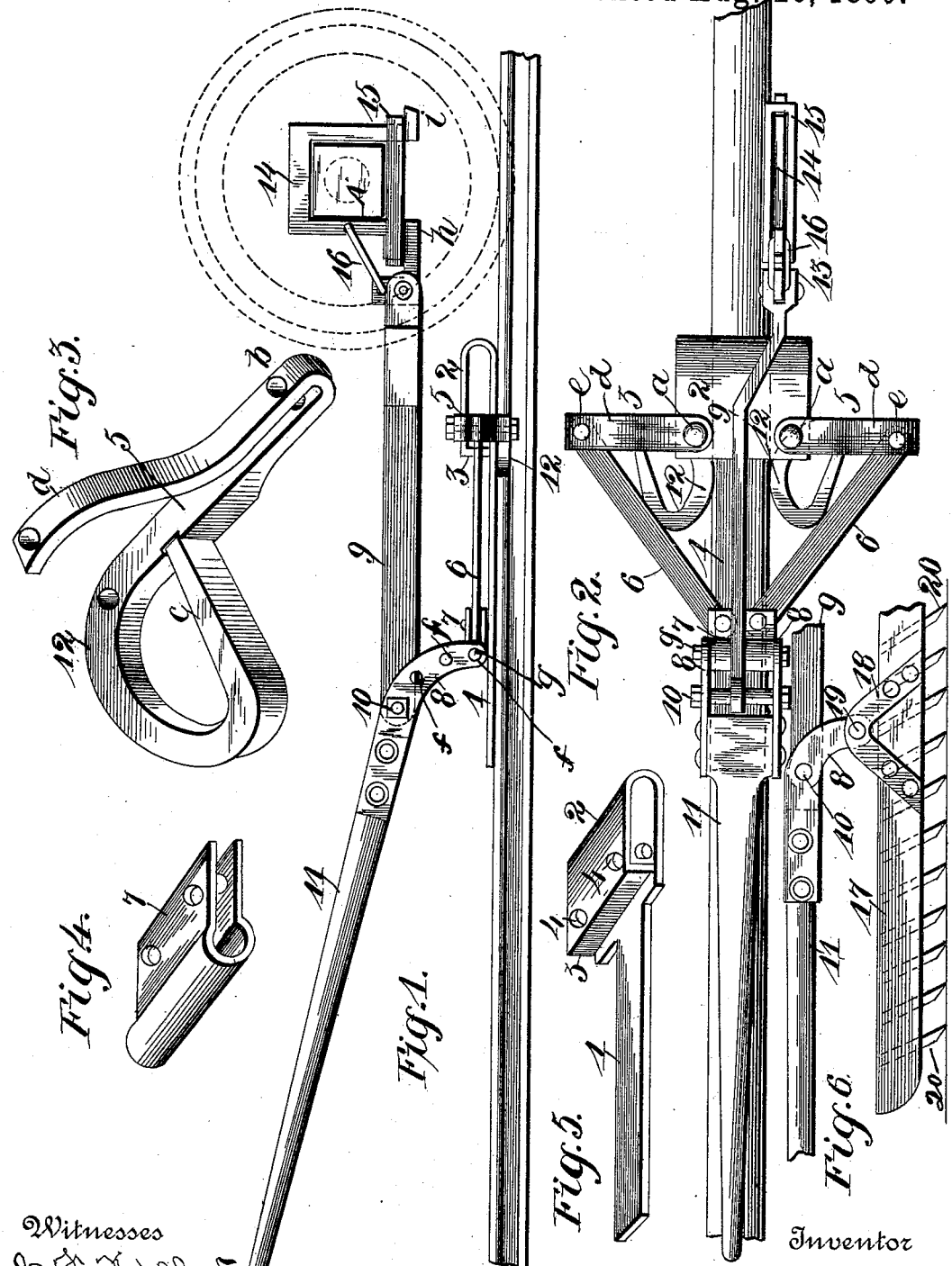
Witnesses
Inventor
George W. M. Simms.
By his Attorneys
Higdon & Higdon

UNITED STATES PATENT OFFICE.

GEORGE W. M. SIMMS, OF DE SOTO, MISSOURI.

CAR-MOVER.

SPECIFICATION forming part of Letters Patent No. 435,326, dated August 26, 1890.

Application filed June 16, 1890. Serial No. 355,601. (No model.)

*To all whom it may concern:*

Be it known that I, GEORGE W. M. SIMMS, of De Soto, in the county of Jefferson, State of Missouri, have invented certain new and useful Improvements in Car-Movers, of which the following is a full, clear, and exact description, reference being had to the accompanying drawings, forming a part hereof.

My invention has for its object to provide certain new and useful improvements in car-movers; and it consists in the novel combination and arrangement of parts, as will be hereinafter more fully described, and pointed out in the claims.

In the drawings, Figure 1 is the side elevation of my complete invention, showing its application to a rail and car-axle. Fig. 2 is a top plan view of my invention. Fig. 3 is a perspective view of one of the gripping-jaws. Fig. 4 is a perspective view of the clip to which the lower end of the lever is attached. Fig. 5 is a perspective view of the carriage, to which the working parts of my invention are attached and which moves upon the upper surface of the rail; and Fig. 6 is a side elevation, partly broken away, of a modification of my invention.

Referring to the drawings, 1 represents the carriage, the wider portion of which is bent and folded upon itself, as shown at 2, the lip 3 of which bears against the upper surface of the said carriage for supporting and bracing the same.

4 4 represent two holes formed in the carriage 1, through which bolts $a$ pass for connecting the gripping-jaws 12 thereto.

5 5 represent two gripping-jaws, each of which is preferably formed of a single piece of metal, and which are connected to the carriage 1 by means of bolts $a$. The gripping-jaws 5 are provided with curved faces 12, which faces bear against the side of the rail when leverage is applied to the extreme end $b$ of the same.

$c$ are arms leading from the curved faces 12, the ends of which bear against the body of the gripping-jaws and prevent the said faces from being bent or dislocated when leverage is applied.

$d$ are arms leading from the body of the gripping-jaws 5 and suitably bent to form sufficient space to receive the carriage 1 between the said arms and body thereof, and at which point the said gripping-jaws are attached to the said carriage.

6 6 represent two links leading from and connected by means of suitable bolts or rivets $e$ $e$ to the ends $b$ of the gripping-jaws 5.

7 represents a clip formed of a single piece of metal, and to which the links 6 6 are also bolted or movably connected in any suitable manner, said clip resting upon the upper surface of the carriage 1, and moves upon the same when in operation.

11 represents a hand-lever, to which is secured two curved plates 8 8, and through said plates are formed a suitable number of openings $f$, by means of which the leverage may be varied.

$g$ represents a bolt passing through the extreme lower openings $f$ of the plates 8 and through the clip 7, forming a connection at that point.

9 represents a horizontal arm, suitably bent and connected to the plates 8 between the same by means of a bolt 10.

14 represents a box-shaped saddle, one end of which is connected to the fork 13, formed on one end of the arm 9.

15 is a link, which encircles the saddle 14, and is held in position by the lip $i$, formed on the said saddle. A brace 16 is secured to one side of the saddle and to the projecting arm $h$ of the same for strengthening and further preventing the link 15 from being lost. The saddle 14 is made, preferably, of the shape of the projecting box A for the car-wheel, and to which the draft is applied.

When my invention is applied to the car-axle, as shown, and the carriage 1 is placed upon the upper surface of the rail, the lever 11 is pressed down, causing the gripping-jaws 5 to grip or bite the edge of the rail and at the same time move the car. When the lever is raised, the jaws 5 will release their grip upon the rail, allowing the carriage 1 to move and get ready to take a fresh grip upon the rail when the said lever is again forced down. When it is desired to push the car, the bolts 10 and $g$ are removed and the lever 11 placed with the handle in a reverse direction to that illustrated in the drawings, and the said bolts again placed in their proper positions.

In the modification shown in Fig. 6 a gripping-body 17 is shown, to which are attached ears 18, to which in turn is secured the lever 11 by means of bolt 19.

20 represents inclined teeth projecting from the under surface of the body 17, which teeth are intended to slide or ride over the cross-ties in one direction and grip in the opposite direction. The gripping-body 17 is especially necessary where the surfaces of the rails do not project a sufficient height to allow the previously-described gripping-jaws to be used.

This device is to be used in connection with the cross-ties, and which slides in one direction when the lever 11 is raised, the teeth of which hold the said body in a stationary position when the said lever is forced down.

This invention is intended to be used especially at way-stations where cars are to be moved a short distance without the use of a locomotive generally employed for such purposes.

Having fully described my invention, what I claim is—

1. A car-mover consisting of a gripping-carriage 1, a lever 11, attached to the said carriage, an arm 9, connected to said lever, a saddle or yoke 14, attached to said arm for engaging the axle-box, a link encircling the saddle or yoke, and a brace 16, to hold said link in position, substantially as described.

2. A car-mover consisting of a slidable carriage 1, gripping-jaws 5, attached thereto, links 6, attached to the said gripping-jaws, a clip 7, attached to the opposite ends of the said links, a lever 11, attached to the clip 7, an arm 9, bolted to the said lever, and a device located upon the said arm for attachment to a car-axle box, substantially as described.

3. A car-mover consisting of a sliding carriage 1, gripping-jaws 5, attached thereto, having arms $b$, links 6, attached to the said arms and connected to a clip 7, located above the surface of the carriage 1, a lever 11, provided with curved plates 8 and connected to the said clip, an arm 9, connected to the said plates by a bolt 10, and a saddle 14, bolted to the said arm provided with a link 15, substantially as described.

In testimony whereof I affix my signature in presence of two witnesses.

GEORGE W. M. SIMMS.

Witnesses:
C. F. KELLER,
I. KIBURZ.